United States Patent [19]

Devlin

[11] Patent Number: 5,456,550
[45] Date of Patent: Oct. 10, 1995

[54] PROCEDURE FOR DELIVERING A SUBSTANCE INTO AN AQUIFER

[75] Inventor: John F. Devlin, Kitchener, Canada

[73] Assignee: University of Waterloo, Waterloo, Canada

[21] Appl. No.: 822,713

[22] Filed: Jan. 21, 1992

[30] Foreign Application Priority Data

Jan. 21, 1991 [GB] United Kingdom ............... 9101254

[51] Int. Cl.$^6$ ........................................... B03B 3/00
[52] U.S. Cl. ........................... 405/128; 210/170; 210/747; 405/52; 588/249
[58] Field of Search ..................... 405/258, 128, 405/129, 36–45, 50, 52, 266; 210/631, 610, 601, 747, 170

[56] References Cited

U.S. PATENT DOCUMENTS

| | | | |
|---|---|---|---|
| 4,288,174 | 9/1981 | Laws | 405/43 |
| 4,469,176 | 9/1984 | Zison et al. | 405/129 X |
| 4,543,016 | 9/1985 | Tallard | 405/129 X |
| 4,678,582 | 7/1987 | LaVigne | 405/128 X |
| 4,687,372 | 8/1987 | Thornton | 405/128 |
| 4,850,745 | 7/1989 | Hater et al. | 405/258 |
| 4,982,788 | 1/1991 | Donnelly | 405/258 X |
| 5,057,227 | 10/1991 | Cohen | 210/747 X |
| 5,076,727 | 12/1991 | Johnson et al. | 405/258 X |
| 5,180,503 | 1/1993 | Gorelick et al. | 210/170 X |
| 5,249,888 | 10/1993 | Byaithwaite et al. | 405/131 X |
| 5,384,048 | 1/1995 | Hazen et al. | 210/610 X |

FOREIGN PATENT DOCUMENTS 0052460  4/1977  Japan ..................... 210/747

Primary Examiner—Dennis L. Taylor
Attorney, Agent, or Firm—Anthony Asquith & Co.

[57] ABSTRACT

A permeable wall (4) is located in the material of an aquifer (2), in the path of an approaching plume (3) of a contaminant (eg a chlorinated solvent). The wall comprises a body (7) of permeable filler material, eg sand and gravel, which is placed in a trench (5) that has been cut down into the aquifer material. Biologically-aided breakdown of the contaminant is aided by the presence of nutrients in the groundwater, and injection ports (18) are provided in the wall, through which the nutrients are injected periodically. The permeability of the wall helps the injected nutrients to spread laterally through the plume. The injected substances are contained in a volume of water; this water may be water which has been extracted from the trench, draw-off wells (9) being provided in the trench for that purpose. A second permeable wall (29) may be provided downstream for injection of eg air.

17 Claims, 3 Drawing Sheets

5,456,550

PROCEDURE FOR DELIVERING A SUBSTANCE INTO AN AQUIFER

This invention relates to the cleaning up of contaminants in groundwater.

BACKGROUND TO THE INVENTION

The conventional procedures for cleaning contaminated groundwater usually have involved taking the groundwater out of the ground, passing the water through a cleaning process, the apparatus for which is above ground, and then either discharging the cleaned water into a drain or stream, or injecting the cleaned water back into the ground.

Under the conventional procedures, the rule has been that the whole of the contaminated groundwater has to be taken out of the ground and passed through an above-ground treatment facility.

Such procedures can be extremely costly, and one major element of the cost arises from the requirement simply of handling the large quantities of water.

The invention is aimed at providing a procedure for cleaning groundwater in-situ, ie in which (at least much of) the groundwater does not have to be removed from the ground.

As to the cleaning process itself, a number of procedures have become conventional. When the contaminant is in suspension, it is possible to simply filter the contaminant out of the water. When the contaminant is dissolved, the contaminant can be sorbed onto a suitable material. In both these cases, however, the contaminant remains intact, and the filter or sorber material still contains the contaminant, and must be disposed of as a hazardous waste. It is much preferred, therefore, that the contaminant be broken down, when that is possible, and converted into harmless substances.

It is known that such breakdown of the contaminants can be achieved through inorganic reactions, and it is also known, especially where the contaminant has an organic component, that contaminants may be broken down by a biological reaction. (This term includes a bio-chemical reaction, ie a chemical reaction which is biologically assisted.)

The invention is aimed at providing an especially convenient means of supplying nutrients and other reactive substances into groundwater, for the purpose of promoting such biological reactions, while the groundwater remains in the ground.

In this specification, the term "aquifer" is used in its broad sense to include any body of ground containing water, and through which the water may move, and is not limited only to a body of ground containing a water supply.

GENERAL FEATURES OF THE INVENTION

The invention provides a procedure for delivering such substances as biological nutrients into groundwater contained in an aquifer.

In the invention, a trench is excavated in the ground, preferably laterally across the direction or line of the velocity of the moving groundwater. Into the trench is placed a filler material. The arrangement is such that the moving ground-water passes from the material of the aquifer into the trench, through the filler material in the trench, and passes into the material of the aquifer on the other side of the trench.

In the invention, the nature of the filler material is such that the permeability of the filler material is not less than, and preferably is substantially greater than, the permeability of the material of the aquifer.

The invention provides a conduit, having an injection port; the conduit and port are so located within the body of filler material in the trench that the port is in operative communication with water within the trench.

The invention also includes the provision of a means for injecting substances, through the conduit and the injection port, into the water in the trench.

It will be preferred, in many cases, that the substance to be injected be mixed, prior to injection, with a relatively large quantity of water; in this case, the conduit and port should be suitable for the injection of such large quantities.

In the invention, the arrangement of the conduit and its injection port, and the manner of injection, are such that the injected substance, upon injection through the port, spreads through the body of filler material.

One of the major difficulties encountered upon attempting to introduce nutrients and the like into groundwater lies in how the substance is to be distributed evenly over a large area, such as the cross-sectional area of a below-ground plume.

If an engineer were to insert an injection port directly into the aquifer, then, as the groundwater flowed past the port, the substance would simply be carried downstream from the port. The tendency of the substance to spread laterally would be quite minimal. Accordingly, if he is to achieve any worthwhile dispersion of the nutrients, by the process of injecting the nutrients directly into the aquifer, the engineer must provide a large number of closely-spaced ports.

Providing a large number of below-ground injection ports, spread over a wide area, is hardly less expensive than pumping all the contaminated groundwater out of the ground.

In the invention, the permeable or porous filler material in the trench comprises a means by which water may flow laterally with respect to the direction of velocity of the groundwater. Therefore, the engineer need provide only a much smaller number of injection ports.

The invention thus provides a permeable wall, which may be placed in the path of a plume of contaminant contained within flowing groundwater in an aquifer. The permeable wall offers a means whereby substances injected into the groundwater can be dispersed laterally so that the substances can spread throughout the cross-sectional area of the plume.

Preferably, the engineer provides that the substances to be injected into the groundwater are mixed with a volume of water (preferably above ground) and the substances are injected along with the volume of water. The invention promotes the rapid spread, upon injection, of the injected water left and right into the porous filler material.

The moving groundwater then gradually passes through the filler material: the injected substances, by now being well-dispersed throughout the material, are picked up evenly over the whole flow.

One of the main concerns in promoting the biological breakdown of certain contaminants in groundwater is that the biological reactions often occur most advantageously under anaerobic conditions. Often, in order to break a contaminant down, it is necessary to chemically reduce the contaminant; the microbial agents, however, will only reduce the contaminant if no other oxidant is available. If other oxidants are available, these must be removed before the contaminant can be reduced. In the invention, (most of)

the groundwater may remain in the ground, and therefore can be expected to be naturally in an almost anaerobic state. That being so, the nutrients that are injected therefore waste only a little of their potential, and can soon start to promote the reduction of the contaminant.

The nutrient mixture to be injected can be prepared so as to promote a rapid depletion of whatever dissolved oxygen may be present, and to stimulate indigenous, previously dormant anaerobic micro-organisms.

It should be noted that some contaminants, eg chlorinated solvents, bio-degrade under reducing conditions to substances which are hardly less toxic. Where it happens that the new substance is one which requires, for its breakdown, a different mix of the nutrients or other substances, a second porous wall may be located downstream, and the new mix may be injected through that.

Alternatively, if the new substance is one which requires aerobic conditions for its destruction (vinyl chloride for example), again a second wall may be provided downstream, and oxygen may be injected into the groundwater at this second wall. A second permeable wall, at which oxygen can be injected, may be useful in any event to ensure the removal of all previously injected nutrients, and other organic substances that may still be present.

DETAILED DESCRIPTION OF PREFERRED EMBODIMENT

By way of further explanation of the invention, an exemplary embodiment of the invention will now be described with reference to the accompanying drawings, in which:

FIG. 1 is a vertical cross-section through an aquifer, and shows a permeable wall placed in the path of a moving plume contaminants;

FIGS. 2A, 2B, 2C, and 2D are plan views of the aquifer shown in FIG. 1, and show the progressing effect of the treatment taking place at the permeable wall;

Figure 1:
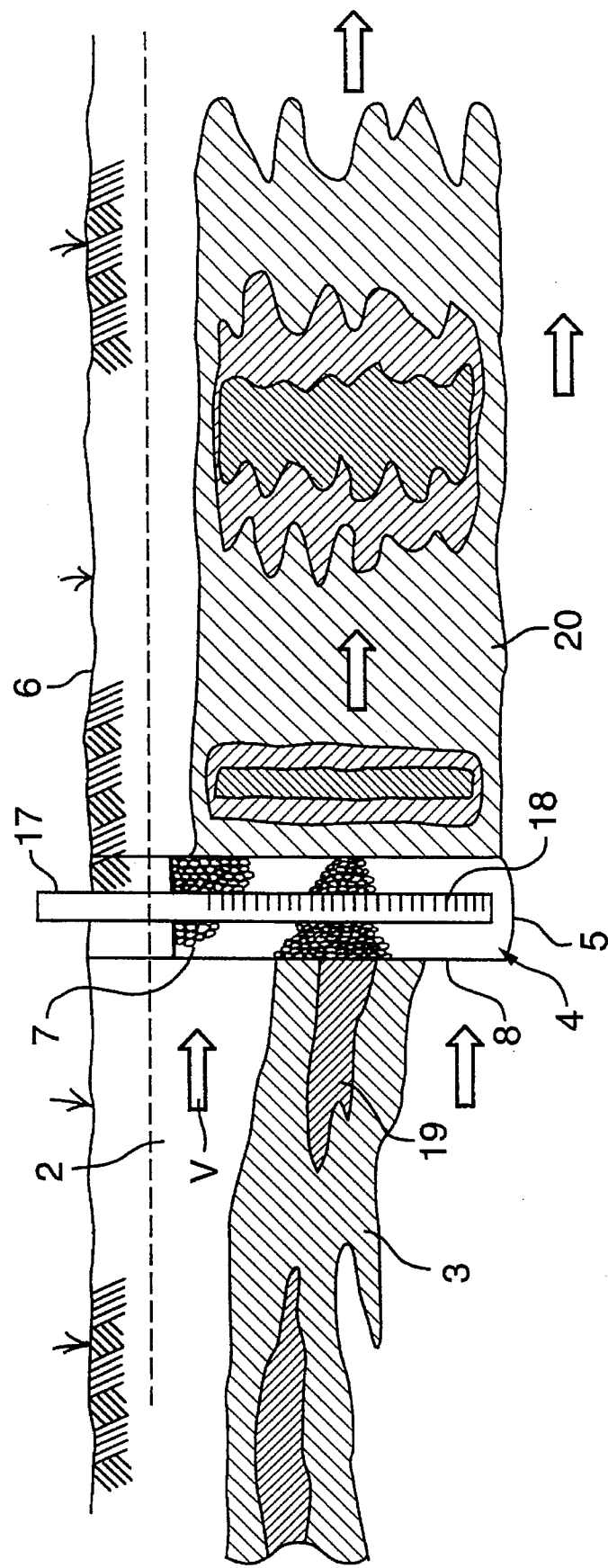

The apparatus shown in the accompanying drawings and described below are examples which embody the invention. It should be noted that the scope of the invention is defined by the accompanying claims, and not necessarily by specific features of exemplary embodiments.

The aquifer 2 is saturated with groundwater, which is moving through the aquifer with a velocity V. The velocity is not uniform, but increases or decreases in accordance, mainly, with changes in the permeability of the material of the aquifer. Thus, a local portion of the water may have a velocity of, say, 50 cm per day, while the water a few meters ahead, or to the side, has a velocity of only 10 cm per day.

In the case as illustrated, a plume 3 of contaminant is being borne along with the moving groundwater. Often, the nature of the contaminants, and the nature of the aquifer material, will be such that the contaminants are somewhat retarded relative to the groundwater, and the average velocity of the contaminant plume will be a little less than V. And, just as the velocity is not uniform, it would not be expected that the degree of retardation of the contaminants would be uniform throughout the aquifer.

Thus the groundwater, and the contaminants, although their forward movement can be characterized generally as being smooth, nevertheless it can be considered that the groundwater and the contaminants do move forward, to some extent, in surges. The result is that the contaminants within the aquifer are much more thoroughly mixed longitudinally along the direction of the velocity of the plume, than laterally relative thereto. In other words, the plume does not tend to spread itself out, nor to smooth itself out, in the lateral direction, but the plume does tend to spread itself out, and to smooth itself out, longitudinally. Of course this is not stated as a universal mode of behaviour of all contaminant plumes, but it is common.

In accordance with the invention, a permeable wall 4 is placed in the aquifer 2, in the path of the plume 3. The permeable wall is contained within a trench 5, which is formed, by excavation from the surface 6, down into the material of the aquifer. The trench contains a body 7 of filler material, being sand and gravel or the like, of such a consistency that the body 7 is substantially more permeable, ie more conductive, than the surrounding aquifer material.

The sides 8 of the trench 5 are not provided with physical walls, so that the water can pass freely from the aquifer material, through and into the body 7 of sand and gravel, and then pass out, at the other side, back into the aquifer material. Sometimes, it will be preferred to install a geotextile fabric, or the like, between the body 7 and the aquifer material, to prevent particles of soil from entering the body 7, but care should be taken that such fabric does not hinder the groundwater from flowing into and through the trench. Also, as a practical matter, it can be difficult (ie expensive) to locate the geo-textile material in place during installation.

Within the body 7 of sand and gravel is a well 9. The well includes a number of water draw-off ports 10, through which water present in the trench 5 may enter the well. The well is of conventional construction, and comprises a tube of rigid plastic or metal, the tube having slits or holes or other perforations to allow water to enter the tube. A suitable screen arrangement prevents infiltration of particles into the tube. The portion of the tube over which the perforations extend may be set by the engineer in accordance with his mapping of the vertical location of the plume within the aquifer.

A suitable pump 12 is provided above ground, or in the well, to draw the water in the well up to the surface.

The water drawn out of the well is fed into a receptacle 13. (It will usually be preferred that the receptacle 13 be of such a construction that the water contained therein is not exposed to the atmosphere.) A facility 14 is provided for adding a measured quantity of a nutrient preparation, or other reactive substances, 15 to the water. A means 16 is also provided for stirring the added substances 15 into the water.

The water containing the nutrients is passed back into the body 7 of sand and gravel via through a conduit comprising one or more pipes 17. The pipes are provided with injection ports 18. The injection pipe and ports are similar in construction to those described in relation to the well 9.

As mentioned, the body 7 of sand and gravel is substantially more porous and more permeable than the surrounding aquifer. The result is that the water injected through the injection ports 18 will tend to flow sideways, ie laterally, out into the body of sand and gravel. Depending on how much more permeable the sand/gravel is than the aquifer material, the injected water will more easily spread itself laterally into the body of sand and gravel within the trench, than spread itself into the less permeable surrounding aquifer.

It should be noted that the drawing off of water through the well or wells 9 contributes to the lateral spreading of the injected water. It is contemplated, in the invention, that the substance to be injected may be injected by itself, without being first dissolved in, or mixed with, a large volume of water; also, it is contemplated that the injection operation might take place on its own, ie without the simultaneous removal of water through the draw-off wells. Generally, however, it will be preferred that the substance is accompanied by large quantities of water, and that water is drawn out of the trench at more or less the same rate as the water, with the substance, is injected into the trench. The circulation of water thus promoted, within the trench, greatly aids the lateral spreading of the substances. If water were not pumped out of the trench, there would be considerable leakage of the substance longitudinally into the aquifer.

In the particular case illustrated, the procedure is operated on a non-continuous basis. Batches of the nutrient-treated water from the receptacle 13 are injected periodically into the trench. The quantity of nutrient-treated water injected should be great enough that the injected water spreads out and occupies substantially all of the body of sand and gravel in the trench. If the nutrients were mixed into too small a quantity of water, the nutrients would not be spread over the whole trench.

The body 7 of sand and gravel in the trench 5, being a permeable wall, thus comprises an agency through which the nutrients can spread laterally. It is essential that the body 7 be no less permeable than the material of the surrounding aquifer 2: if the material in the trench were less permeable than the material of the surrounding aquifer, the injected water would tend to spread longitudinally into the surrounding aquifer.

Figure 2A:
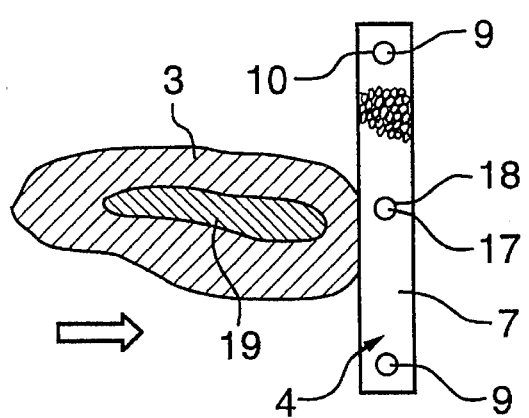

In FIG. 2A, the plume 3 of contaminant is shown approaching the wall 4 in the trench 5. The contaminants tend naturally to be concentrated in streaks 19 of the plume.

Figure 2B:
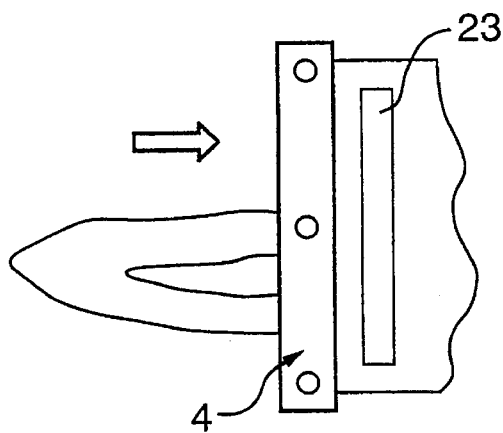

FIG. 2B shows the situation some time after a batch of nutrient-laden water has been injected into the wall 4. The batch 23 has moved away from the wall, having been borne along by the moving groundwater. The batch is well spread out laterally over the width of the emerging plume 20.

Figure 2C:
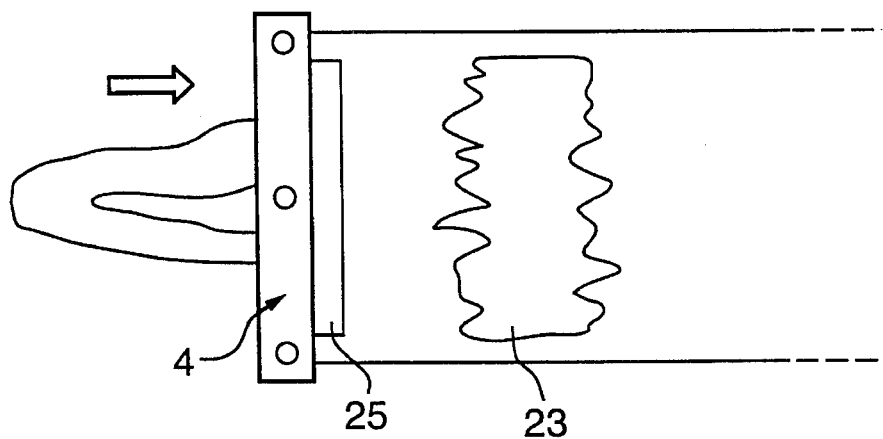
Figure 2D:
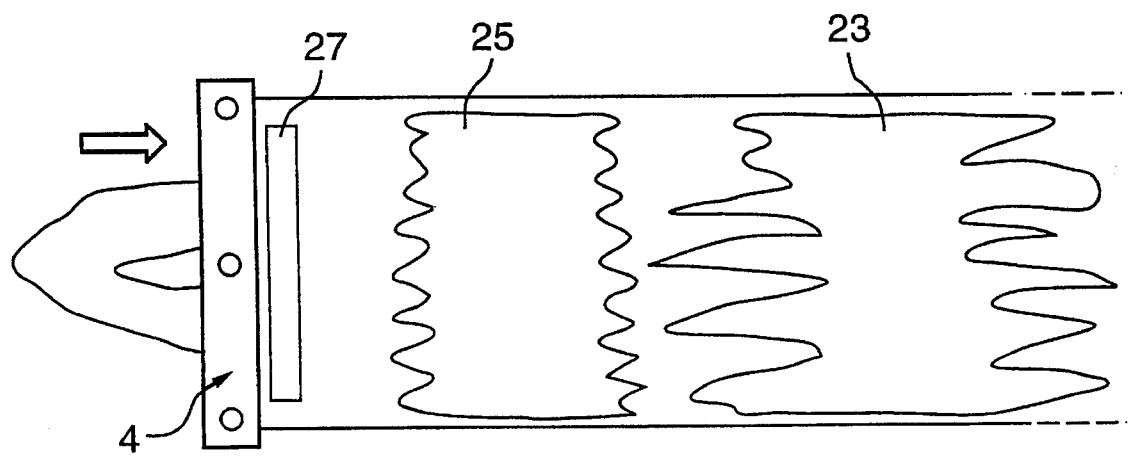
Figure 3:
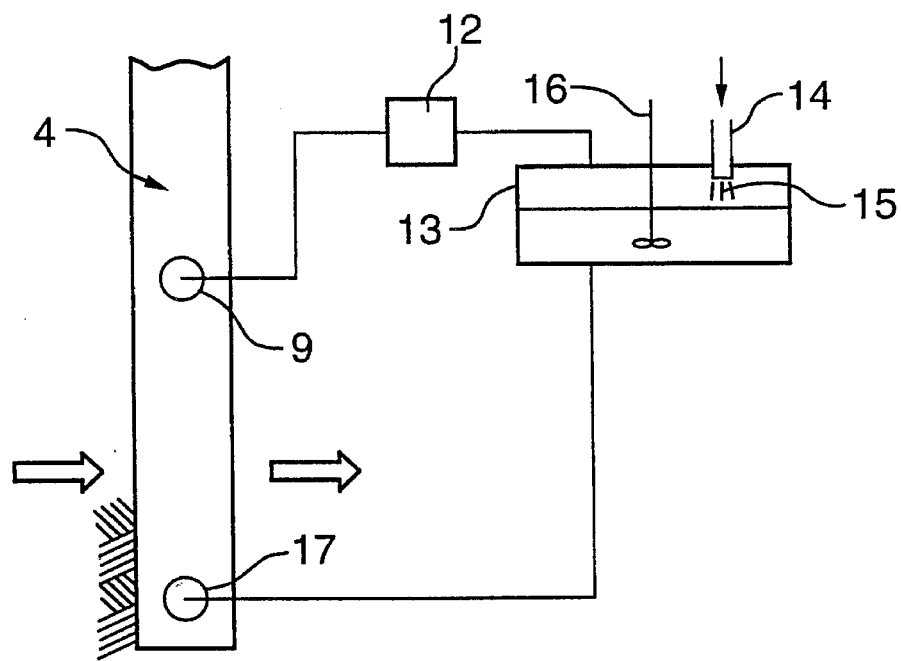
FIG. 3 is a diagram showing ancillary apparatus provided at the ground surface.

FIGS. 2C and 2D show further batches 25,27 of nutrient-laden water that have been injected into the wall. As shown, the first batch 23 has started to spread out longitudinally.

Thus, the nutrients enter the contaminated plume in longitudinally-discrete batches: but the batches themselves are spread homogeneously over the cross-sectional area of the plume. It will be appreciated that if the contaminants are to be broken down effectively, the nutrients must be spread out through the whole contaminated area. As shown in FIGS. 2C and 2P, the discrete batches of nutrient-laden water tend gradually to expand into each other, and to run into and merge with each other, along the line of the velocity of the plume.

Thus, it may be stated that the invention takes care of the lateral dispersion of the nutrients, whilst the longitudinal dispersion taken care of itself.

The extent to which the nutrients can be expected to be distributed homogeneously over the whole width of the trench is determined by a number of factors, such as the difference in permeabilities between the aquifer and the sand, the injection pressure (due to the hydraulic head of the receptacle 13), the number of and spacing of the injection pipes and ports, etc; however, one of the important parameters that determine lateral homogeneity is the volume of the batch of water into which the nutrients are mixed, prior to injection, in relation to the volume of water contained within the trench. The greater the volume of water injected into the trench, the more it can be expected that the nutrients injected with the water will be spread evenly over the whole extent of the trench.

Typically, the volume of the batch of nutrient-laden water will be roughly equal to the volume of the body 7 of sand and gravel.

In many cases, all of the water removed from the trench will be injected, ie replaced into the ground. The draw-off and injection of the water therefore amounts to a circulation of the water. The water, upon being drawn out, passes through the receptacle 13, where the nutrients are added. The capacity of the receptacle is enough to contain the water long enough to allow the nutrients to be added and to be mixed in, and to dissolve if appropriate.

The nutrients and other substances preferably are brought to, and stored at, the site in concentrated form, and are only mixed into the water just before being injected.

The rate at which the water is pumped need not be large: typically, the process of injecting a batch my be expected to take several days. In the periods between the injections of the batches, typically several weeks or months, the system need not be operated at all. During these passive periods, the plume may be expected to pass through the trench with little or no lateral diffusion of the streaks 19: if desired, an occasional circulation of the water within the trench could be instigated, in order to promote lateral diffusion of the contaminants within the plume.

Once injected, the longitudinal dispersion of the nutrients is not perfect, of course, and the injected batches should not be so far apart that longitudinally-spreading nutrient from one batch cannot spread far enough to meet the nutrient spreading from the neighbouring batch. The nutrients as a rule tend to move at the same velocity as the water: the longitudinal spreading arises mainly because natural variations in the permeability of the aquifer permit the water and the nutrients together to accelerate and decelerate, rather than because the nutrients are retarded relative to the water.

It is recognised that the longitudinal spreading of the nutrients is of a substantial magnitude. If, in order to merge with each other, the batches had to be so close together as to be almost continuous, and if the volume of water injected has to be substantially equal to the volume of the trench, the system would hardly be better than the conventional systems where all the water in the aquifer is pumped out, of the ground. It is recognised that the required degree of mixing and dispersion and distribution can be achieved, with the system as described, while still leaving (most of) the water in the ground.

If the injections are too infrequent, ie too far apart, the adjacent batches of nutrient will not link up. If the injections are too frequent, or too close together, the process will be uneconomical.

In cases where the injected volume of water is roughly equal to the volume of the body 7, it is suggested that the adjacent batches of nutrients will merge satisfactorily if the batches are spaced apart so as to allow a quantity of groundwater between five times and twenty times the volume of the body 7 to pass through the trench between injections.

At this ratio, only one fifth or one twentieth of the groundwater is removed from, and replaced into, the ground, while the reminder of the groundwater stays in the ground.

In fact, the water that is injected into the trench need not be water that has been extracted from the trench; however, this will usually be the most convenient source for the water to be injected.

Figure 4:
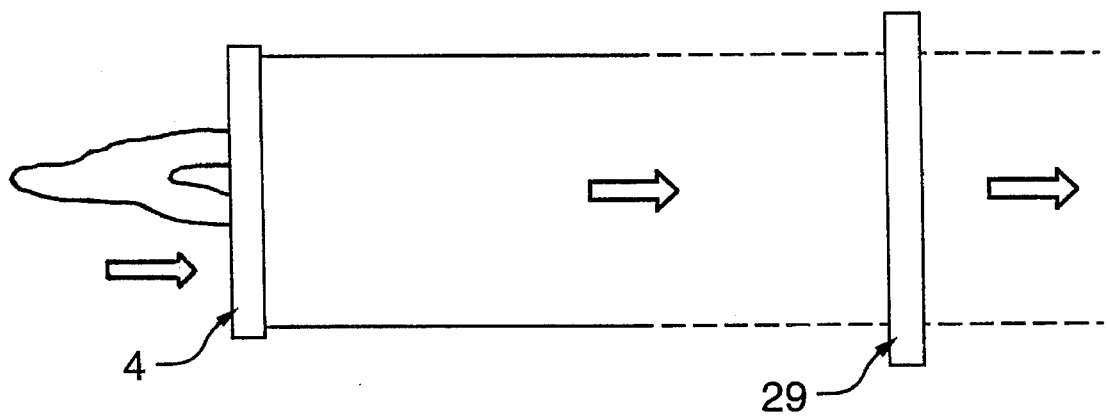
FIG. 4 is a cross-section showing a second permaeable wall, downstream from the wall of FIG. 1.

As mentioned, sometimes it is advantageous that a second permeable wall be provided. FIG. 4 shows such a second wall 29. At this wall, the substance to be injected often will be aerated (or oxygenareal) water. It is also contemplated that the injected substance my be air itself, in gaseous form—ie the air is injected directly and emerges from the injection ports in bubbles; with gaseous air, the degree of lateral spreading of the air into the plume would be not great, although vertical spreading of the air could be excellent.

It is recognised, however, that one of the major advantages of the invention is that it allows the water that is to be treated to remain in the ground. This fact is important in the case of those kinds of treatments of contaminants which require anaerobic conditions, because groundwater in an aquifer naturally is often (almost) anaerobic, but this advantage would be lost if the water had to be taken out of the ground. In the case of the kinds of treatment that require the water to be aerated, on the other hand, there is of course no advantage in the fact that the water is naturally anaerobic.

Thus, a permeable wall may be used to promote the spread of nutrients, or other substances, over an entire plume, for anaerobic treatment, and also a permeable wall may be used to promote the spread of injected air, or aerated water, over an entire plume: only in the first of these cases can advantage be taken of the tact that groundwater in an aquifer is naturally anaerobic.

By extracting water from the trench, the pressure gradients (which cause the groundwater to move) will be altered, and altered in such a manner, sometimes, as to ensure that the edges of the plume do not leak around the edges of the trench. It may be preferred, in such cases, therefore to inject less water than has been removed. The excess water may be dumped: insofar as the water to be dumped is contaminated, it may be cleaned by one of the conventional above-ground cleaning systems.

Care should be taken that the injection is not done in such a way that locally-induced pressure gradients would tend to push the outer portions of the plume beyond the edges of the trench. The engineer should make the trench wide enough to cater for such excursions; or he may make sure the draw-off ports lie outside the injection ports.

The trench 5 is excavated from the surface down into the material of the aquifer. The trench should be deep enough, and long enough, that the whole of the plume 3 passes through the body 7 of sand and gravel. Typically, the trench will be cut by means of a hoe-type bucket on a mechanical arm. The width of the trench would be dictated by the width of the bucket, ie of the order of 1 meter wide.

Generally, the kind of material found in an aquifer which permits a substantial velocity of groundwater is not self-supporting, in that the sides of a trench cut in such material easily fall in. One conventional technique is to insert the material with which the trench is to be filled simultaneously and directly as the bucket makes the cut.

This technique has been developed in respect mainly of walls that are intended to block the flow of groundwater. The problem in such, walls generally has been to ensure that the wall does not leak: in the present case, the requirement for the wall to be sealed against leakage of course does not arise. The cutting and filling of a trench does require care and skill, and the use of the correct equipment: but it is recognised that the trench as described is not too demanding in this respect.

As mentioned, in the invention, it is essential that the wall be no less permeable than the aquifer. However, it should be noted that this requirement applies to the operation of the wall, and not necessarily to its installation. It my be preferred, for instance, that the loose material of the wall be mixed, prior to installation, with, for example, a dense carbohydrate material, because the resulting slurry is often easier to install than loose sand and gravel. The material would be such that it would degrade and disappear after a time, leaving just the sand and gravel. But the material, until it disappeared, could make the wall almost impermeable.

The permeable wall of the invention may be used to aid in the clean-up a known spill of a contaminant, for example in order to prevent the contaminant from moving off the property of the contaminator. Alternatively, the invention may be used to assist in the clean-up of a plume of indeterminate origin that may be heading too close to a water-supply well. It may be preferred, where a well is drawing groundwater from all directions, that the permeable wall of the invention completely encircles that well.

The advantages of the system as described, as a manner of introducing nutrients and other substances into an aquifer, may be summarised as:

a) the permeable wall ensures that the entire contaminant wall may be treated;

(b) the circulation of water in the permeable wall may be conducted at intervals of months or more, depending on the hydrogeological conditions at the site. Thus the system may be passive most of the time, and therefore inexpensive to maintain;

(c) the nutrient source in the permeable wall is renewable without any aditional excavation after the initial installation of the wall;

(d) once the remediation is completed, the system can be decommissioned without further excavation.

I claim:

1. Procedure for delivering a substance into an aquifer, comprising the steps;

of excavating a trench in the material of the aquifer;

placing a body of a filler material in the trench;

where the nature of the filler material is such that the permeability of the filler material is not less than the permeability of the material of the aquifer;

of providing a conduit having an injection port;

of so locating and disposing the conduit and the port within the body of filler material in the trench that the port is in operative communication with water within the trench;

of injecting a substance into water in the trench through the injection port;

the arrangement of the conduit and port, and the manner of the injection, are such that the injected substance, upon injection through the port, spreads along, into, and through the filler material.

2. Procedure of claim 1, where the nature of the filler material is such that the permeability of the filler material is substantially greater than the permeability of the material of the aquifer.

3. Procedure of claim 1, where the trench has sides, and the nature of the sides is such that groundwater may pass, substantially completely freely, through the sides of the trench from the material of the aquifer into the filler material, and from the filler material into the material of the aquifer.

4. Procedure of claim 1, wherein:

the trench has sides, and the procedure includes the step of inserting fabric material into the sides of the trench;

whereby the fabric material acts to prevent infiltration of the material of the aquifer into the body of filler material;

and the nature of the fabric material is such as to permit groundwater to pass through the sides of the trench from the material of the aquifer into the filler material, and from the filler material into the material of the aquifer.

5. Procedure of claim 1, wherein the step of injecting the substance into the water includes the steps:

of providing a volume of water, and of mixing the substance to be injected into the volume of water;

and of injecting the volume of water and the substance together through the injection port.

6. Procedure of claim 5, wherein the substance to be injected is, or includes, a mix of nutrients of such a composition as will promote the biochemical breakdown of the contaminant, within the aquifer.

7. Procedure of claim 5, wherein the said volume of water is roughly equal to the volume of the body of filler material.

8. Procedure of claim 5, wherein the said volume of water includes water that has been extracted from the trench.

9. Procedure of claim 8, wherein the procedure includes the steps of providing a well in the body of the filler material, and of providing a water draw-off port within the well, and of extracting water from the trench through the draw-off port.

10. Procedure of claim 5, including the step of injecting such volumes of water periodically, wherein the time taken for the injection of each volume of water is comparatively short, and the time between injections is comparatively long.

11. Procedure of claim 10, wherein the said comparatively short time, being the time taken for injection, is no longer than the time taken for the moving groundwater to traverse through the trench.

12. Procedure of claim 11, wherein the comparatively long time, being the time between injections, is long enough to allow a volume of groundwater of between five and twenty times the volume of the body of filler material to traverse through the trench.

13. Procedure of claim 1, including the steps:

of plotting the extent of a plume of contaminant in a body of groundwater contained within an aquifer, and of determining the velocity of the said plume;

of positioning the trench laterally across the line of the velocity of the plume, the trench being of sufficient depth and extent that substantially all of the contaminant passes through the trench.

14. Procedure of claim 13, wherein the contaminant is of the kind that can be biochemically reduced under anaerobic conditions.

15. Procedure of claim 14, wherein the contaminant is a chlorinated solvent.

16. Procedure of claim 14, where the substance to be injected includes nutrients for promoting the said biochemical reduction.

17. Procedure of claim 13, wherein the substance to be injected is, or includes, oxygen, and the contaminant is of the kind that can be broken down under aerobic conditions.

* * * * *